Patented Aug. 15, 1933

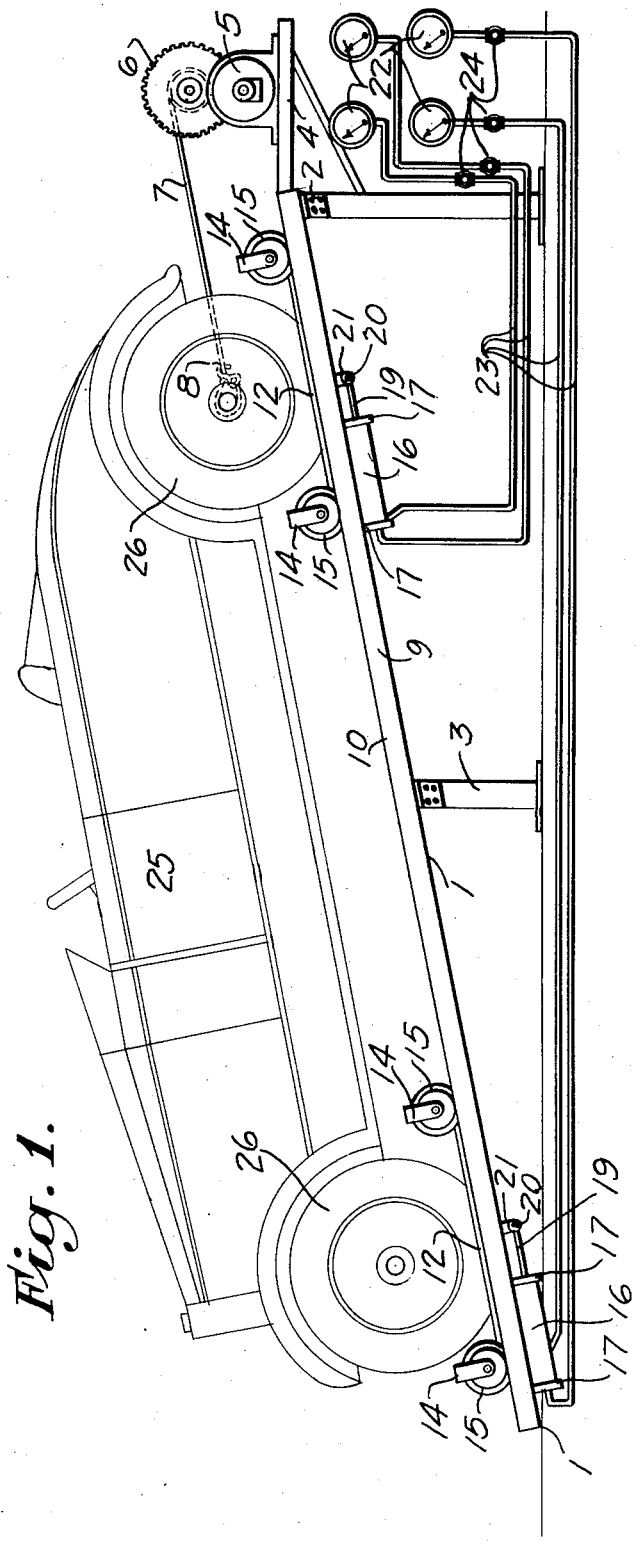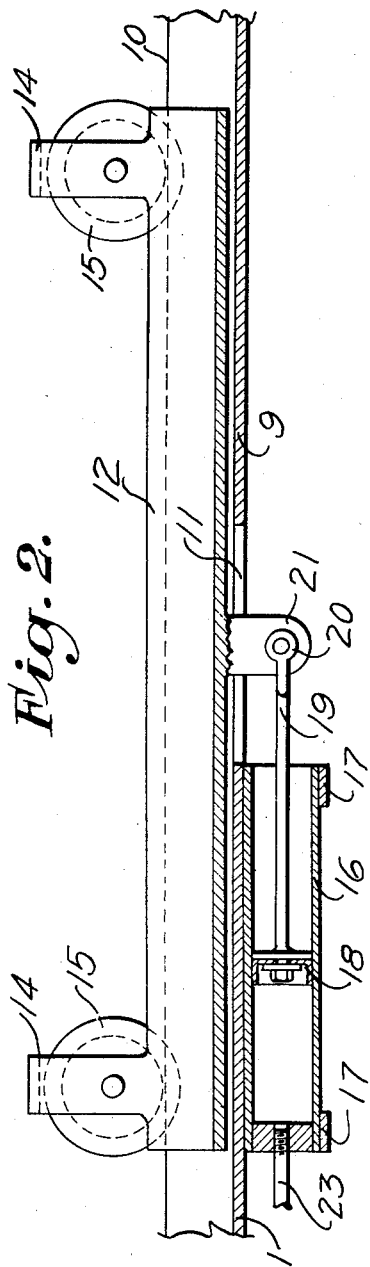

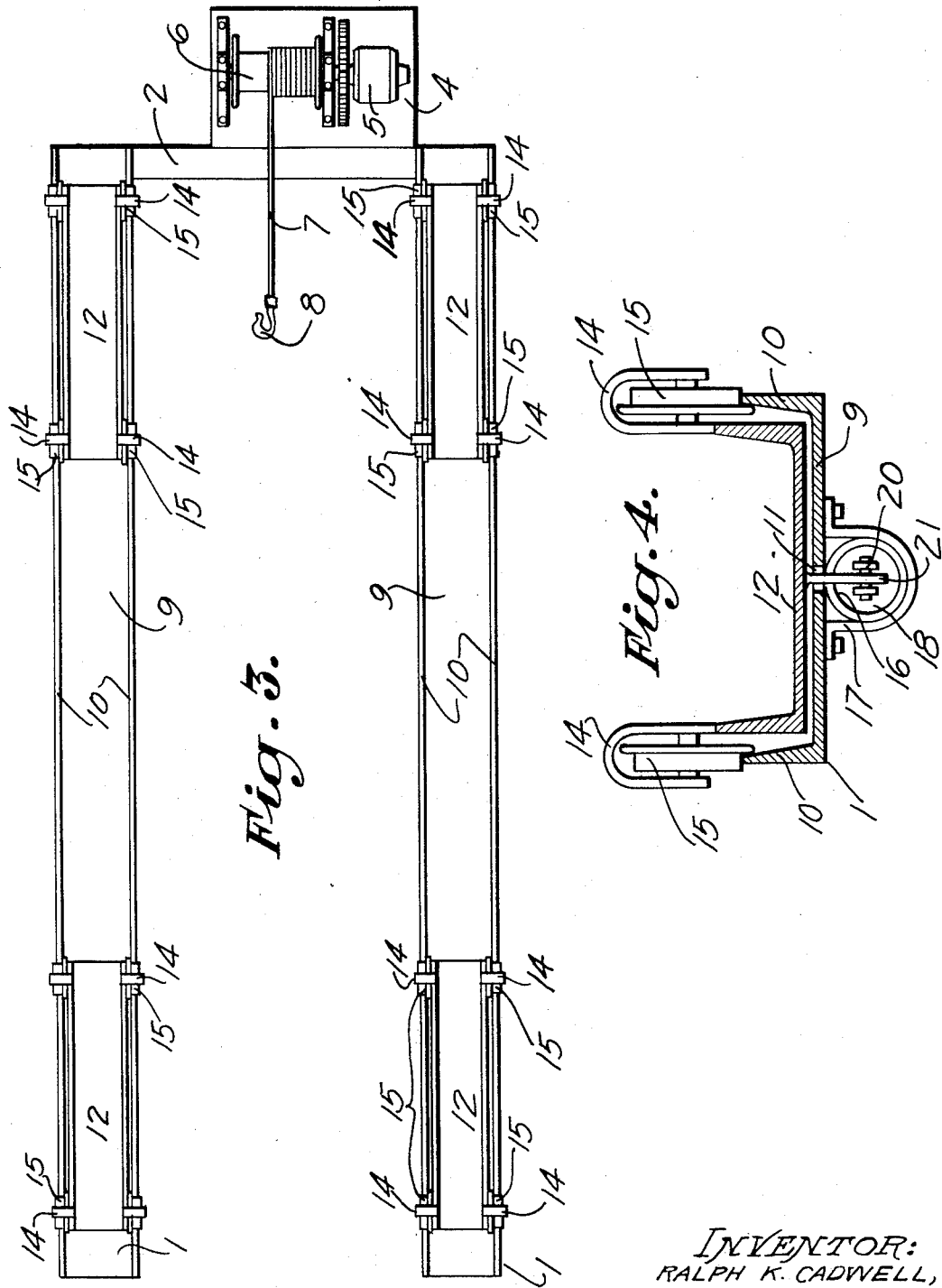

1,922,659

UNITED STATES PATENT OFFICE 1,922,659

STATIC BRAKE TESTER

Ralph K. Cadwell, Glendale, Calif., assignor to Cadwell-Baird Iron Wks., Los Angeles, Calif., a copartnership consisting of Edward F. Baird and Ralph K. Cadwell Original application October 7, 1927, Serial No. 224,681. Divided and this application November 1, 1929. Serial No. 403,939

8 Claims. (Cl. 265—47)

This invention relates to the testing of the brakes of a vehicle for the purpose of determining the relative gripping power of the respective brakes, and relates particularly to a device of this character which may be used to simultaneously test the four brakes of a vehicle so equipped.

It is an object of the invention to provide a simple and novel form of brake testing machine and a new method of testing the brakes of a vehicle. In the invention I have provided a relatively stationary support having thereon a complement of wheel receiving members or carriages and means disposed between the carriages and the support tending to resist the movement of the carriages relative to the support and being capable of indicating or measuring the pressure exerted on said carriages by the braked wheels of a carriage supported on the carriages. In the practice of the brake testing method, the vehicle is placed with its wheels resting on the carriages, the brakes of the vehicle are then actuated to a desired degree, after which a force is permitted to act in such a manner as to tend to move the vehicle chassis relative to the support. This force, tending toward movement of the vehicle, is transmitted to and divided between the separate carriages in proportion to the gripping or retarding value of the brake associated with each respective wheel.

This application is a division of my present application entitled auto brake testing machine, Serial No. 224,681, filed October 7, 1927, Patent No. 1,889,735, November 29, 1932, and has for a further object to provide a brake tester in which the motivating force for moving the vehicle is derived from the weight of the vehicle and its associated parts.

It is an object of the invention to provide a series of sloping wheel receiving members on which the wheels of a vehicle to be tested will tend to roll under the force of gravity of the vehicle, thereby exerting in the vehicle a force tending to move such vehicle relative to the supports on which the wheel receiving members are carried, this force being transmitted to and divided between the wheel receiving members in proportion to the efficiency of the respective brakes associated with the wheels of the vehicle.

A further object of the invention is to provide a simple means for placing the vehicle so that its wheels will rest in proper positions on the wheel receiving members.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a device constructed in accordance with the invention;

Figure 2 is a fragmental longitudinal section of one of the shoes and attendant parts;

Figure 3 is a top plan of the device depicted in Figure 1;

Figure 4 is a cross section on the line 4—4 of Figure 3;

Referring to Figures 1, 2, 3 and 4, the device is disclosed as including a supporting structure comprising channel-shaped tracks 1, connected by an end frame 2, the frame 2 and intermediate props 3 serving to hold the tracks 1 at an incline, as delineated in Figure 1, these props forming a means tending to cause a relative movement. The end frame 2 carries a table 4 on which is mounted a motor 5 connected to a winch 6, a line 7 being wound around the winch and being provided with a connection 8.

Each track 1 includes a base 9 and side flanges 10. The base 9 has openings 11. Channel-shaped shoes 12 are located within the tracks 1 and have upstanding hangers 14 on which are journaled wheels 15 adapted to move along the edges of the side flanges 10 of the tracks 1. Fluid pressure cylinders 16 are provided and are adapted to contain any kind of a fluid, either liquid or gas. The cylinders 16 are secured at 17 to the bases 9 of the tracks 1. Pistons 18 operate in the cylinders 16 and the rods 19 of the pistons are connected at 20 to ears 21 on the shoes 12, the ears being movable in the openings 11 of the tracks. Pressure gages 22 are connected by pipes 23 with the cylinders 16, the pressure gages being illustrative of any sort of indicating means. In the pipes 23 are interposed valves 24 which may be used to keep fluid pressure from the pressure gages 22.

The numeral 25 designates an automobile, the wheels of which are shown at 26.

In practical operation, the connection 8 is made fast to the rear axle of the automobile 25, the motor is put into operation to drive the winch 6, and the winch reels in the line 7, and the automobile is towed up the inclined tracks 1 until each of the wheels 26 rests on one of the shoes 12. The brakes on the automobile are set and the line 7 is detached from the vehicle or is slacked away so that the vehicle can gravitate down the shoes 12.

If the vehicle could roll without friction over the shoes 12, the shoes would remain stationary. If the wheels 26 had a perfect grip on the shoes 12, the shoes would move as far as the wheels. Between these theoretical limits, and as a matter of practice, the amount that each shoe 12 moves depends on the drag that the brake associated therewith is putting on the corresponding wheel. Each shoe 12, therefore, will move somewhat with its corresponding wheel 26. When the shoe 12 moves, the rod 19 operates the piston 18 and pressure is created in the cylinder 16, the pressure being transmitted through the associated pipe 23 to a pressure gauge 22. By obtaining a reading on each of the pressure gauges 22, the operator can note the relative efficiency of the several brakes and the efficiency of all of the brakes relative to a fixed standard. The gravity or weight of the vehicle produces an impelling force tending to move the vehicle down the shoes 12. This impelling force is met by and divided between the respective shoes in proportion to the respective retarding effects of the separate brakes.

In the practical operation of the device, the brakes are set to such extent that their combined gripping effects will be sufficient to prevent movement of the vehicle. When this condition exists the total frictional resistance of all of the brakes will be equal to the impelling force tending to move the vehicle. If one or more brakes is doing more work than the others, such condition will be shown by a larger reading of one or more of the gages 22 and a smaller reading of the remaining gages, the total reading of the entire set of gages 22 being always the same amount for a given car. For example, should the weight of a given car be such that the impelling force is 3000 pounds, the readings of the separate gages 22 when the brakes are properly adjusted will be 750 pounds each. If the brakes are not in adjustment, a reading of the gages such as 650, 700, 800 and 850 might be witnessed, but the total reading for this particular vehicle will always be the same, namely 3000 pounds.

Although I have shown and described a simple and practical embodiment of my invention, it is evident that certain parts thereof are representative of other parts, elements or mechanisms which may be employed in substantially the same manner to accomplish substantially identical results; therefore, it is to be expressly understood that the invention is not limited to the details disclosed herein and herewith but shall have the scope of the following claims.

I claim as my invention:

1. In a device for testing the brakes of a vehicle: an elongated supporting structure; movable members mounted on said supporting structure adapted to receive the wheels of a vehicle; members fixed to one end of the supporting structure and holding said end in permanently raised position so that the force due to gravity tends to move said vehicle; means operative with said movable members for resisting movement of said movable members; and an indicating device connected to each of said resisting means for showing the relative reaction with which each movable member is held against movement under the translational forces imparted to them by said wheels.

2. In a device of the character described: a movable member adapted to receive a wheel of a vehicle thereon; a supporting structure carrying said member in movable relationship; means for maintaining said supporting structure at a sufficient slope so that the force of gravity will operate to move the vehicle relative to said member; means operative to resist movement of said member; and an indicating device connected to said member for indicating the magnitude of the translational force imparted thereto by said vehicle wheel when rotation of the wheel is resisted by the brake associated therewith.

3. In a device of the character described: a movable member adapted to receive a wheel of a vehicle; a supporting structure carrying said member in movable relationship; means for maintaining said supporting structure at a sufficient slope so that the force of gravity will operate to move the vehicle relative to said supporting structure, thereby tending to move said member; and means operative to resist movement of said member, said means including measuring means for measuring the translational forces imparted thereto by said vehicle wheel.

4. A device as defined in claim 3, including a device for moving the vehicle into position with said wheel thereof on said member.

5. In a device of the character described: a longitudinally sloping supporting structure; wheel receiving members carried by said supporting structure; means for maintaining the supporting structure at a sufficient slope so that the force of gravity will operate to move the vehicle standing on said members from rest, thereby tending to move said members; cylinder-piston means operative between said supporting structure and said wheel receiving members; pressure gauges operatively connected to said cylinder-piston means; and a power device for moving a vehicle into position on said wheel receiving members.

6. In a device of the character described: a supporting structure; wheel receiving members movable on said supporting structure, said members having longitudinally sloping wheel receiving surfaces; means for maintaining the supporting structure at a sufficient slope so that the force of gravity will operate to move the vehicle standing on said members from rest, thereby tending to move said members; and means operative to resist movement of said wheel receiving members, said means including measuring means for measuring the translational forces exerted thereagainst by the wheels of a vehicle.

7. In a device of the character described: a supporting structure including a pair of longitudinally sloping track members; wheel receiving members longitudinally movable on said sloping track members; a collapsible device operative between each of said wheel receiving members and said supporting structure, there being fluid in said collapsible members to resist collapsation thereof and to resist movement of said wheel receiving members; means for measuring the pressure of the fluid in each of said collapsible members; and a winch at the upper end of said supporting structure for pulling a vehicle up said track members to position with its wheels engaging said wheel receiving members so that the force due to gravity tends to move said vehicle relative to the supporting structure.

8. In a device for testing the brakes of a vehicle: a supporting structure; movable members mounted on said supporting structure adapted to receive the wheels of a vehicle; means holding said supporting structure in sloping position so that the force due to gravity tends to move said vehicle; means operative with said movable members for resisting movement of said movable members; and an indicating device for each of said means for resisting movement of said movable members for showing the relative reaction with which each movable member is held against movement under the translational forces imparted to them by said wheels.

RALPH K. CADWELL.